(No Model.)
C. GARNETT.
CORN THINNER.
No. 492,721. Patented Feb. 28, 1893.
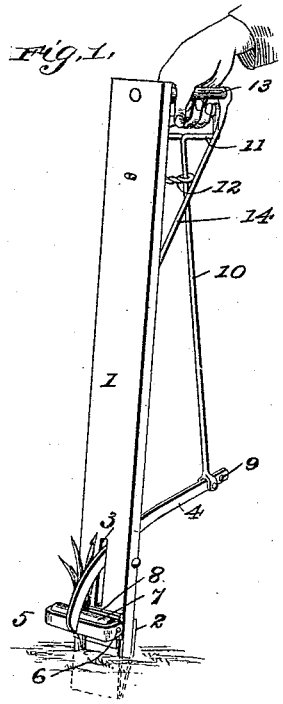
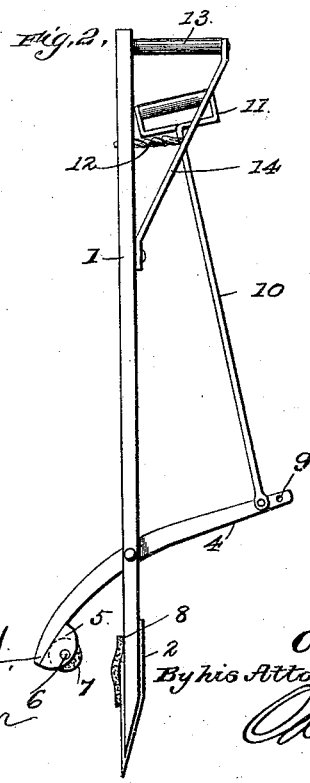
Witnesses:
John M. Biggs
Chas. S. Ayer
Inventor:
Carroll Garnett
By his Attorneys,

UNITED STATES PATENT OFFICE.

CARROLL GARNETT, OF FRONT ROYAL, VIRGINIA.

CORN-THINNER.

SPECIFICATION forming part of Letters Patent No. 492,721, dated February 28, 1893.

Application filed June 7, 1892. Serial No. 435,918. (No model.)

*To all whom it may concern:*

Be it known that I, CARROLL GARNETT, a citizen of the United States, residing at Front Royal, in the county of Warren and State of Virginia, have invented a new and useful Corn-Thinner, of which the following is a specification.

This invention relates to devices for thinning corn, cotton or cane, and consists of the construction and arrangement of the parts thereof, as will be more fully hereinafter described and claimed.

The object of this invention is to provide a device of the character set forth adapted to be used with one hand for the purposes stated, but is especially applicable for thinning corn, the parts thereof being simple and effective in their construction and operation, strong and durable and comparatively inexpensive.

In the drawings:—Figure 1 is a perspective view of the improved device. Fig. 2 is a side elevation thereof.

Similar numerals of reference are employed to indicate corresponding parts in the several views.

Referring to the drawings the numeral 1, designates a bar or support of suitable material, either metal or wood, and when constructed of wood the lower end thereof is covered with a metallic shielding or wear-plate 2. The lower end of the bar or support is tapered so that it may readily penetrate the ground and adjacent thereto is a longitudinally disposed slot 3, wherein is pivotally mounted an arm or lever 4. The said arm or lever 4, projects beyond the opposite sides of the bar or support 1, and is of a somewhat curved construction, and carries a yoke 5, on the front end thereof, which embraces a rod 6, on which is mounted a rubber or elastic tube 7, which can be turned or revolved if desired to change the wearing surface and thereby equalize the wear throughout the circumference of the same. Below and adjacent to the slot 3, is a transversely arranged rubber strip 8, between which and the said roller 7, the corn, cotton, or cane, is held during the operation of thinning the same, and the elastic or yielding nature of the said parts 7 and 8 is especially advantageous in thinning corn by obviating tearing or injury to the corn-stalks or plants being removed. The rear end of the lever 4, is constructed with one or more openings 9, and is embraced adjustably by the lower end of a rod 10, having a handle 11, at the upper end thereof. The said rod 10, is guided in its movement and sustained in proper working position by a bracket or eye 12, extending outward from the rear portion of the upper part of the bar or support 1, and immediately above the said bracket or eye is a grip 13, rigidly positioned and suitably supported by a brace 14, secured to the free end thereof and to the said bar or support 1.

In operating the device the lower end of the bar or support 1, is embedded or caused to penetrate the ground a suitable or preferred distance adjacent to the stalk or plant to be removed, the arm or lever 4, having been first moved away from the support as shown in Fig. 2. The handle 11, on the rod 10, is then gripped by the fingers of the hand and drawn upward, thereby bringing the stalk or plant toward and against the bar or support 1, and between the roller 7 and the strip 8, and when in this position the said bar or support is suddenly lifted bringing the stalk or plant upward therewith as will be readily seen. Owing to the arrangement and position of the several parts the operation set forth can be accomplished by the use of one hand only thereby making the device convenient and advantageous. It will be understood that the device may also be readily used for weeding purposes equally as well and in the same manner as for thinning corn, cotton, or cane.

By changing the point of attachment of the rod 10, with the arm or lever 9, the throw of said arm or lever may be varied as may be required for different purposes.

Having thus described the invention, what is claimed as new is—

In a device of the character set forth, the combination of a bar or support having a grip at the upper rear side thereof and a lower tapered end, an arm or lever pivotally mounted in the lower portion of said bar or support and extending from opposite sides of the same, a yoke in connection with the front end of said arm or lever, supporting an elastic tube adapted to be turned, an elastic strip secured to said bar or support, and an operating rod adjustably secured to the opposite end of said arm or lever and having a handle on the upper end thereof, substantially as described.

In testimony that I claim the foregoing as my own I have hereto affixed my signature in the presence of two witnesses.

CARROLL GARNETT.

Witnesses:
 JOHN H. SIGGERS,
 W. S. DUVALL.